United States Patent
Chen et al.

(10) Patent No.: US 11,822,848 B2
(45) Date of Patent: Nov. 21, 2023

(54) DISPLAY CONTROL METHOD AND RELATED DISPLAY CONTROL APPARATUS AND DISPLAY DEVICE

(71) Applicant: Realtek Semiconductor Corp., HsinChu (TW)

(72) Inventors: Ding-Wei Chen, HsinChu (TW); Che-Han Liu, HsinChu (TW)

(73) Assignee: Realtek Semiconductor Corp., HsinChu (TW)

( * ) Notice: Subject to any disclaimer, the term of this patent is extended or adjusted under 35 U.S.C. 154(b) by 0 days.

(21) Appl. No.: 18/103,503

(22) Filed: Jan. 31, 2023

(65) Prior Publication Data
US 2023/0315371 A1    Oct. 5, 2023

Related U.S. Application Data

(60) Provisional application No. 63/319,388, filed on Mar. 13, 2022.

(30) Foreign Application Priority Data

Aug. 12, 2022  (TW) ................ 111130362

(51) Int. Cl.
*G06F 3/14*       (2006.01)
*G06T 5/50*       (2006.01)
*H04N 21/4363*    (2011.01)
*G09G 5/14*       (2006.01)

(52) U.S. Cl.
CPC ............ *G06F 3/14* (2013.01); *G06T 5/50* (2013.01); *G09G 5/14* (2013.01); *H04N 21/43635* (2013.01); *H04N 21/43637* (2013.01); *G06T 2207/20221* (2013.01)

(58) Field of Classification Search
CPC ... G06F 3/14; G06T 5/50; G06T 2207/20221; G09G 5/14; H04N 21/4635; H04N 21/43637
USPC ......................................... 345/156
See application file for complete search history.

(56) References Cited

U.S. PATENT DOCUMENTS

| | | | |
|---|---|---|---|
| 9,178,572 B1 * | 11/2015 | Zhang ............ | H01Q 7/00 |
| 2006/0274206 A1 * | 12/2006 | Jang ............. | H04N 5/45 |
| | | | 348/565 |
| 2015/0356045 A1 * | 12/2015 | Soffer ............ | G06F 3/023 |
| | | | 710/303 |

FOREIGN PATENT DOCUMENTS

| | | |
|---|---|---|
| TW | 201117137 A1 | 5/2011 |
| TW | 201445996 A | 12/2014 |

* cited by examiner

*Primary Examiner* — Mark Edwards
(74) *Attorney, Agent, or Firm* — Winston Hsu (57) ABSTRACT

A display control method includes: receiving a first video signal provided by a first video source device to display one or more first images in the first video signal on a display device; when the display device is displaying the one or more first images, establishing a connection with a second video source device and receiving a second video signal provided by the second video source device through the connection; generating one or more composite images based on the one or more first images in the first video signal and one or more second images in the second video signal without receiving a user control input; and displaying the one or more composite images on the display device.

15 Claims, 7 Drawing Sheets

DISPLAY CONTROL METHOD AND RELATED DISPLAY CONTROL APPARATUS AND DISPLAY DEVICE

CROSS REFERENCE TO RELATED APPLICATIONS

This application claims the benefit of U.S. Provisional Application No. 63/319,388, filed on Mar. 13, 2022. The content of the application is incorporated herein by reference.

BACKGROUND OF THE INVENTION

1. Field of the Invention

The present invention relates to display devices, and more particularly, to a display control method, a display control apparatus and a display device that are operable to automatically enable screen-splitting display in response to wireless projection connections.

2. Description of the Prior Art

With the advancement of technology, there are various display devices on the market that support a picture-in-picture (PiP) mode. When multiple video source devices are coupled to a display device, the PiP mode allows video contents provided by theses video source devices to be respectively displayed in different regions of the screen. Typically, the user needs to open an on-screen display (OSD) menu of the display device to enable the PiP mode, and also needs to specify video source devices to respectively correspond to a main screen and a sub screen through the OSD menu. Only after these settings are completed, the display device is able to properly render the PiP mode. On the other hand, although many display devices support wireless projection, they are not able to display video contents that are provided through wireless projection under the PiP mode. In view of this, conventional display devices still have many shortcomings that need to be improved.

SUMMARY OF THE INVENTION

In view of this, it is one object of the present invention to provide a display control method, a display control apparatus, and a related display device that are operable to automatically enable a screen-splitting mode or a PiP mode in response to a wired connection or a wireless projection connection. The display control apparatus of the present invention will detect a new wired connection or a new wireless projection connection. While the display device is displaying video contents provided by a certain video source device, if another video source device is coupled to the display device through a new wireless projection connection or a new wired connection, the present invention will enable the screen-splitting mode or the picture-in-picture mode, such that video contents provided by different video source devices can be displayed on the screen at the same time. The present invention does not require user intervention. The screen-splitting mode or the PiP mode is automatically triggered once the new wireless projection connection or the new wired connection is detected, which saves a series of cumbersome operations in configuring the PiP mode on conventional display devices. In view of this, the present invention effectively improves user experience.

According to one embodiment, a display control method is provided. The display control method comprises: receiving a first video signal provided by a first video source device to display one or more first images in the first video signal on a display device; when the display device is displaying the one or more first images, establishing a connection with a second video source device and receiving a second video signal provided by the second video source device through the connection; generating one or more composite images based on the one or more first images in the first video signal and one or more second images in the second video signal without receiving a user control input; and displaying the one or more composite images on the display device.

According to one embodiment, a display control apparatus is provided. The display control apparatus comprise a processing circuit. The processing circuit is configured to receive a first video signal provided by a first video source device, allowing the display device to display one or more first images in the first video signal. The display control apparatus is operable to establish a connection with a second video source device and receive a second video signal provided by the second video source device through the connection when the display device is displaying the one or more first images. The processing circuit is configured to generate one or more composite images based on the one or more first images in the first video signal and one or more second images in the second video signal without receiving a user control input, thereby to allow the display device to display the one or more composite images.

According to one embodiment, a display device is provided. The display device comprises: a display module and a display control apparatus. The display control apparatus is coupled to the display module, and configured to control displaying of the display module, The display control apparatus comprises a processing circuit. The processing circuit is configured to receive a first video signal provided by a first video source device, allowing the display module to display one or more first images in the first video signal. The display control apparatus is operable to establish a connection with a second video source device and receive a second video signal provided by the second video source device through the connection when the display module is displaying the one or more first images. The processing circuit is configured to generate one or more composite images based on the one or more first images in the first video signal and one or more second images in the second video signal without receiving a user control input, thereby to allow the display module to display the one or more composite images.

These and other objectives of the present invention will no doubt become obvious to those of ordinary skill in the art after reading the following detailed description of the preferred embodiment that is illustrated in the various figures and drawings.

DETAILED DESCRIPTION

In the following description, numerous specific details are set forth in order to provide a thorough understanding of the present embodiments. It will be apparent, however, to one having ordinary skill in the art that the specific detail need not be employed to practice the present embodiments. In other instances, well-known materials or methods have not been described in detail in order to avoid obscuring the present embodiments.

Reference throughout this specification to "one embodiment" or "an embodiment" means that a particular feature, structure or characteristic described in connection with the embodiment or example is included in at least one embodiment of the present embodiments. Thus, appearances of the phrases "in one embodiment" or "in an embodiment" in various places throughout this specification are not necessarily all referring to the same embodiment. Furthermore, the particular features, structures or characteristics may be combined in any suitable combinations and/or sub-combinations in one or more embodiments.

Figure 1:
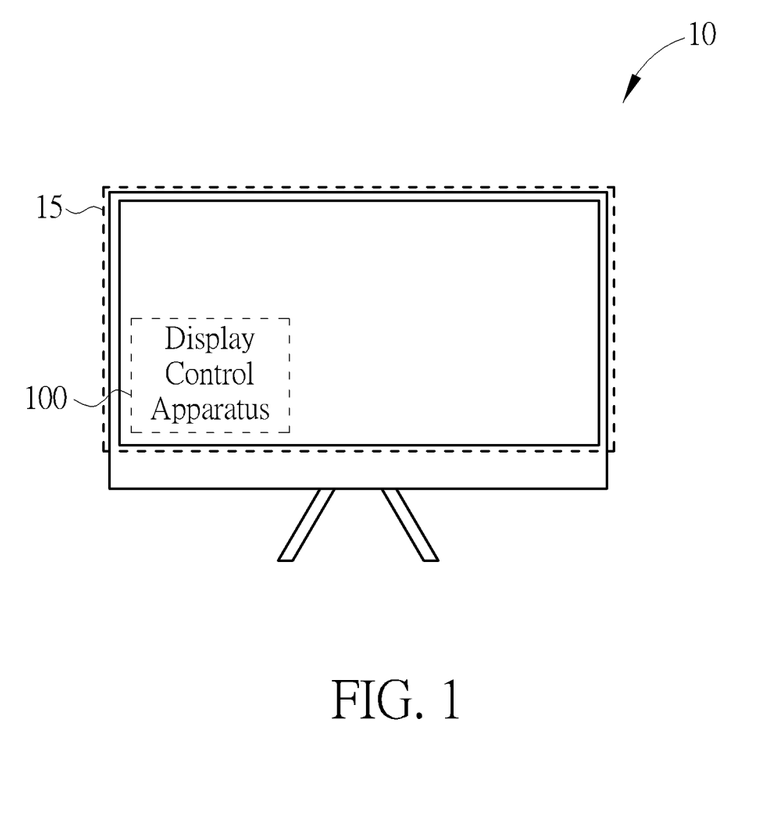
FIG. 1 is a schematic diagram of a display device according to one embodiment of the present invention.

Please refer to FIG. 1, which is a schematic diagram of a display control apparatus and a display device of the present invention. As shown in the figure, a display control apparatus 100 is disposed in a display device 10 and utilized for receiving and processing video signals provided by different video source devices, and accordingly outputting image sequences to a display module 15 in the display device 10 for displaying. The display module 15 may include a display panel and a display panel driving circuit (not shown). The display panel driving circuit is able to drive the display panel based on the image sequences output by the display control apparatus 100. Furthermore, the display control apparatus 100 is configured to detect a wireless projection connection, and automatically trigger a screen-splitting mode or a PiP mode of the display device 10 accordingly.

Figure 2:
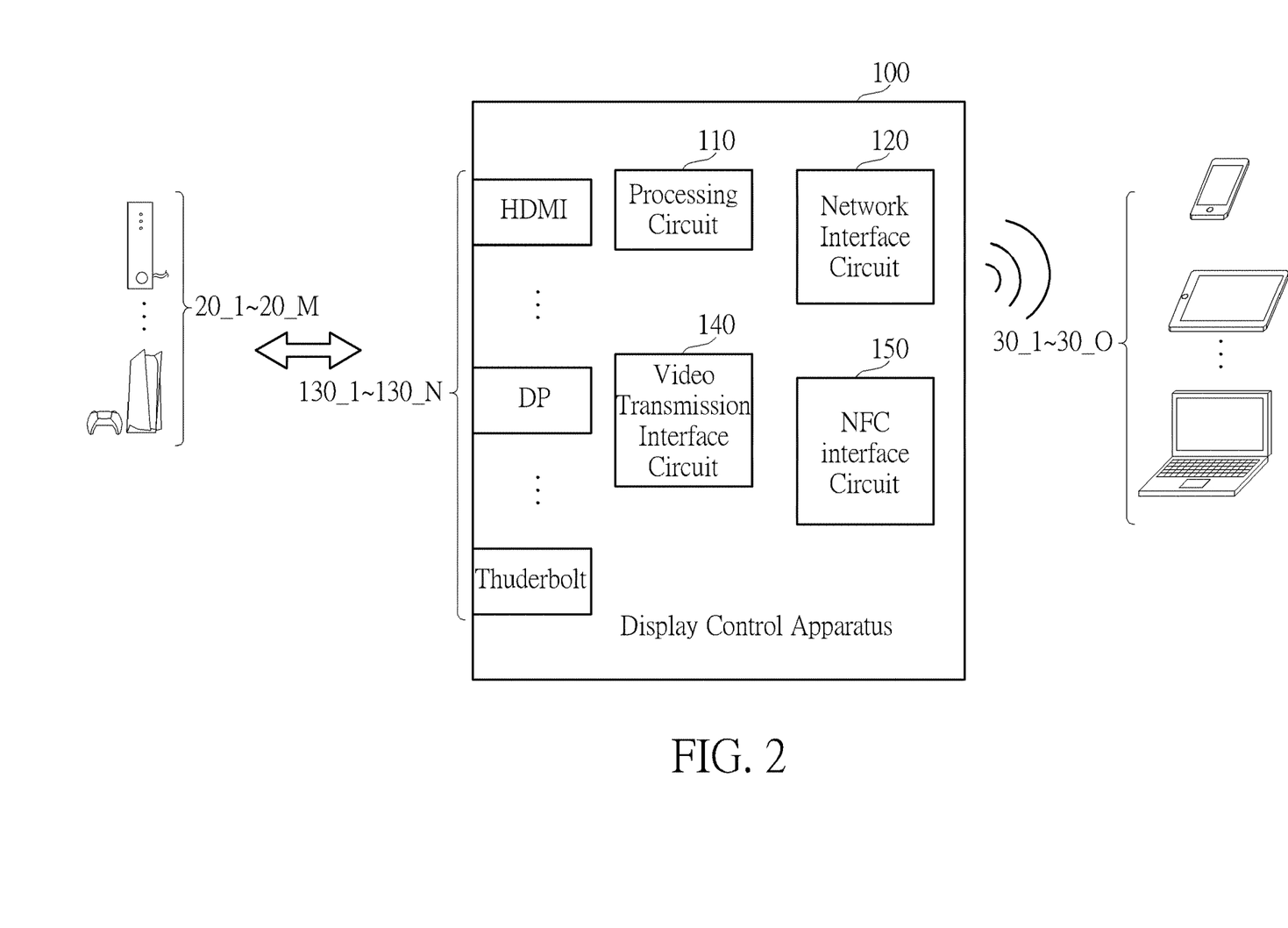
FIG. 2 is a schematic diagram of a display control apparatus according to one embodiment of the present invention.

FIG. 2 is a detailed schematic diagram of a display control apparatus according to one embodiment of the present invention. As shown in the figure, the display control apparatus 100 includes a processing circuit 110, a network interface circuit 120, one or more video connection ports 130_1-130_N, a video transmission interface circuit 140, and a near-field communication (NFC) interface circuit 150. Through wired transmission, the above-mentioned video connection ports 130_1-130_N can be coupled to one or more wired video source devices 20_1-20_M that are capable of providing video contents. In various embodiments of the present invention, the wired video source devices 20_1-20_M can be set-top boxes, game consoles, multimedia players, DVD players, Blu-ray players, notebook computers, desktop computers, smartphones or tablet Computers. These wired video source devices 20_1-20_M may rely on various types of video transmission interfaces, such as high definition multimedia interface (HDMI), DisplayPort (DP), Thunderbolt, or Universal Serial Bus (USB) Type-C, to provide video contents to the display control apparatus 100 for displaying the video contents on the display device 10. On the other hand, the network interface circuit 120 is configured to provide connection capability with other devices. For example, through the network interface circuit 120, the display control apparatus 100 can be coupled to a router or an access point (not shown) through a wireless or wired connection. After the network interface circuit 120 is coupled to the router or the access point, the wireless video source devices 30_1-30_O that are coupled to the router or access point can provide video contents to the display control apparatus 100, so as to achieve wireless projection. For example, it can achieve wireless projection based on the Airplay® protocol introduced by Apple®. In addition, through the network interface circuit 120, the wireless video source devices 30_1-30_O can also provide video contents to the display control apparatus 100 in a Wi-Fi direct manner, so as to achieve wireless projection. For example, it can achieve wireless projection based on the Miracast® protocol developed by the Wi-Fi Alliance. In various embodiments of the present invention, the wireless video source devices 30_1-30_M may be notebook computers, desktop computers, smartphones, tablet computers, or various electronic devices that support wireless projection function.

Figure 3:
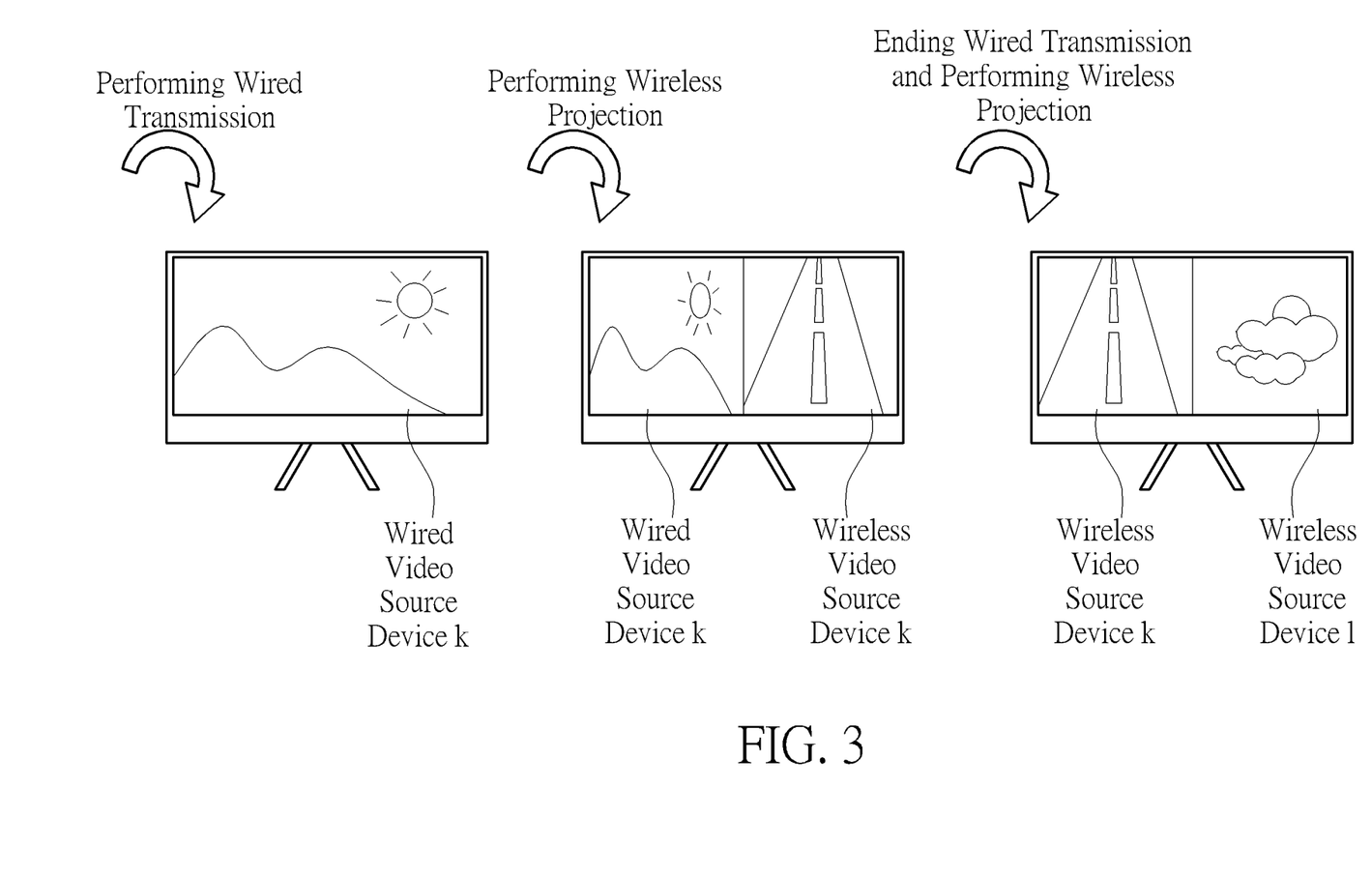
FIG. 3 illustrates operational flow of the display control apparatus according to a first embodiment of the present invention.

FIG. 3 further illustrates how the display control apparatus 100 presents video contents provided by different video source devices through screen-splitting. First, when one of the wired video source devices 20_1-20_M (e.g., the wired video source device 20_k) is coupled to the display control apparatus 100 through one of the video connection ports 130_1-130_N, the video transmission interface circuit 140 will receive the video signal from the video connection port that is coupled to the wired video source device 20_k. Then, the video signal is sent to the processing circuit 110. The processing circuit 110 processes the video signal and provides it to the display module 15 for displaying. At this time, if the user intends to watch video contents provided by other video source devices on the display device 10, the display device 10 is configured to enter the screen-splitting mode or the PiP mode. Specifically, the user can project/cast the screen of one of the wireless video source devices 30_1-30_M (e.g., the wireless video source device 30_k) to the display device 10 (i.e., screen mirroring). Alternatively, specific media contents on the wireless video source device 30_k (e.g., audio and video files stored in the wireless video source device 30_k, media content played through a browser running on the wireless video source device 30_k, or media content played by an application running on the wireless video source device 30_k) can be projected to the display device 10. The wireless video source devices 30_1-30_M can transmit the video contents to the display control apparatus 100 through a wireless connection based on Airplay® protocol or Miracast® protocol.

The display control apparatus 100 can rely on the network interface circuit 120 to detect the wireless projection connection activated by the wireless video source device 30_k, and receive the video signal including video contents provided by the wireless video source device 30_k. After receiving the video signal from the wireless video source device 30_k, the processing circuit 110 is configured to combine the video contents respectively provided by the wired video source device 20_k and the wireless video source device 30_k for being displayed by the display module 15. In addition, if the user intends to display the video content provided by a second wireless video source device (e.g., 30_1) on the display device 10, the user can selectively end the wired video signal transmission between the wired video source device 20_k and the display device 10. For example, it can be achieved by turning off the wired video source device 20_k, or unplugging a transmission cable between the wired video source device 20_k and the display device 10. Next, the user can operate the second wireless video source device 30_1 to make the second wireless video source device 30_1 perform wireless projection, so as to display the video contents that are provided by the wireless video source device 30_k and the wireless video source device 30_1 on the display device 10 at the same time.

It should be noted that that the above process does not require user intervention at all. As long as the user activates the wireless projection connection on the wireless video source device 30_k or the wireless video source device 30_1, the processing circuit 110 can detect the wireless projection connection initiated by the wireless video source device 30_k or the wireless video source device 30_1 through the network interface circuit 120. Accordingly, the processing circuit 110 instantly presents video contents from different video source devices through the screen-splitting mode or the PiP mode. When the wired video source device 20_k and the wireless video source device 30_k provide video contents to the display control apparatus 100 at the same time, the processing circuit 110 will combine one or more images in a video signal that is provided by the wired video source device 20_k with one or more images in a video signal that is provided by the wireless video source device 30_k, thereby to produce one or more composite images. The produced one or more composite images will be sent to the display module 15 for displaying. Furthermore, when the wireless video source device 30_k and the wireless video source device 30_1 provide video contents to the display control apparatus 100 at the same time, the processing circuit 110 will combines one or more images in video signals that are respectively provided by the wireless video source device 30_k and the wireless video source device 30_1. The produced one or more composite images will be displayed by the display module 15. In the above process, the user does not need to issue any operation command to the display device 10 and the display control apparatus 100. The processing circuit 110 can complete the whole process automatically.

Figure 4:
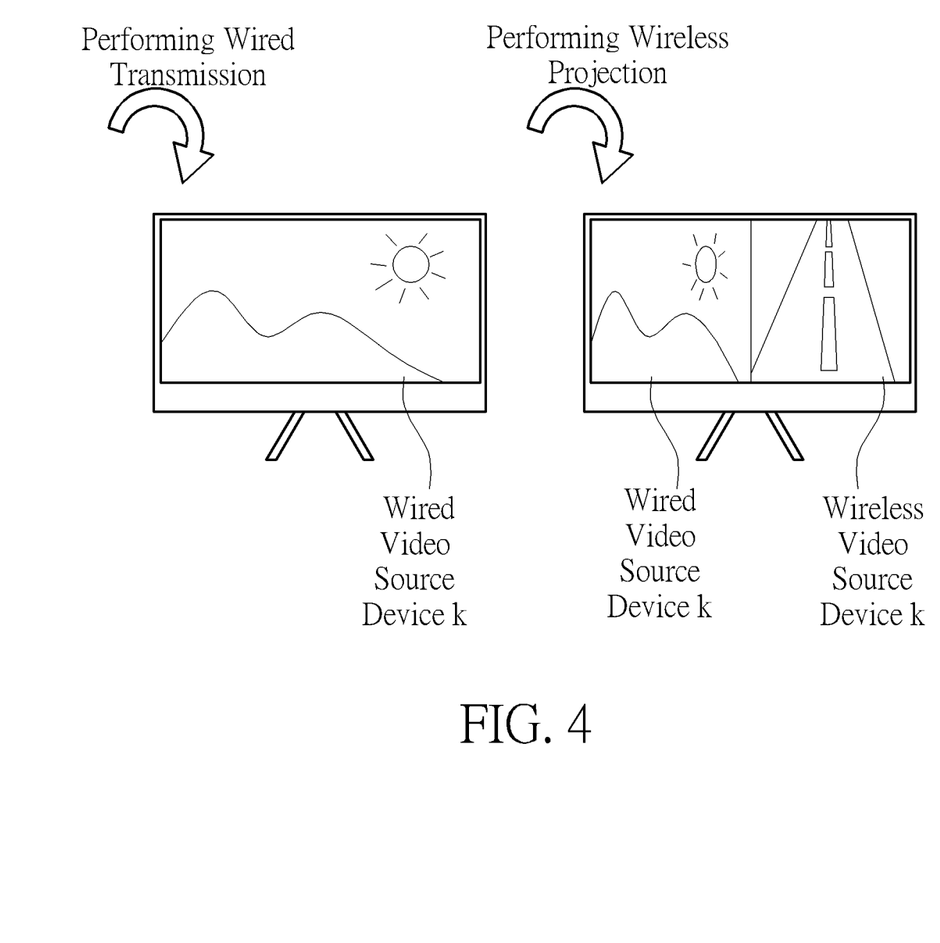
FIG. 4 illustrates operational flow of the display control apparatus according to a second embodiment of the present invention.

In another embodiment shown in FIG. 4, the wireless video source devices 30_1-30_M can also trigger the wireless projection connection through short-range wireless communication with the display control apparatus 100. That is, the user does not need to perform operations on the wireless video source devices 30_1-30_M to activate the wireless projection, but can activate the wireless projection by moving the wireless video source devices 30_1-30_M into a valid distance for short-range wireless communication. The NFC interface circuit 150 in the display control apparatus 100 is operable to establish a wireless projection connection with one of the wireless video source devices 30_1-30_M (e.g., the wireless video source device 30_k) through short-range wireless communication. After that, the wireless video source device 30_k can use the wireless projection connection to transmit the video content to the display control apparatus 100. The display control apparatus 100 will enter the screen-splitting mode or the PiP mode automatically, such that the display module 15 is able to display the video contents provided by the multiple video source devices.

Figure 5:
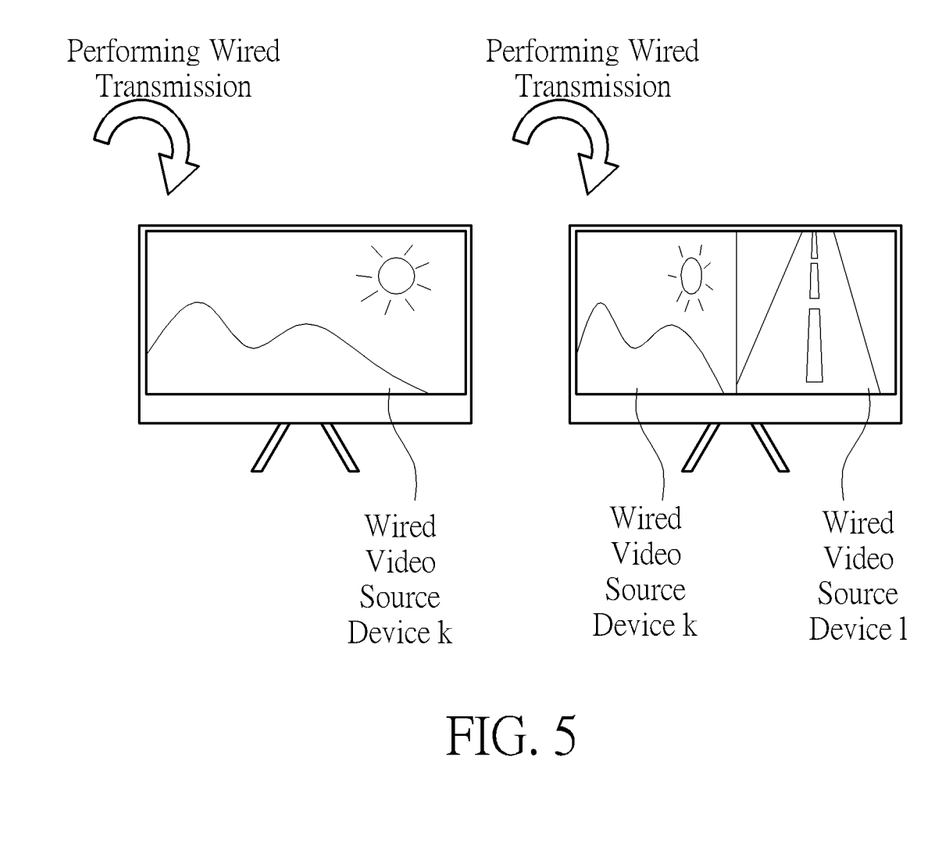
FIG. 5 illustrates operational flow of the display control apparatus according to a third embodiment of the present invention.

In another embodiment shown in FIG. 5, the display control apparatus 100 can also automatically enter the screen-splitting mode or the PiP mode when multiple wired video source devices are coupled to the display control apparatus 100 and turned on. As shown in the figure, when only one wired video source device 20_k is coupled to one of the video connection ports 130_1-130_N of the display device 10 through a wired connection, the display control apparatus 100 will display the video content provided by the wired video source device 20_k in a full-screen mode. However, when a second wired video source device 20_1 is coupled to another one of the video connection ports 130_1-130_N, and the video transmission interface circuit 140 in the display control apparatus 100 detects that the wired video source device 20_1 sends a video signal through the another one of the video connection ports 130_1-130_N, the display control apparatus 100 automatically enters the screen-splitting mode or the PiP mode, so that the display module 15 can simultaneously display the video contents provided by the wired video source device 20_1 and the wired video source device 20_k.

As can be understood from the above descriptions, the display control apparatus 100 can not only automatically enter the screen-splitting mode or the PiP mode in response to a new wireless projection connection, but also automatically enter the screen-splitting mode or the PiP mode in response to a new wired connection. Further, when there is only one wired video source device or only one wireless video source device coupled to the display device 10, the display control apparatus 100 displays the video content provided by the coupled source device in the full-screen mode. After that, once another wired video source device establishes a wired connection with the display control apparatus 100 (i.e., the video transmission interface circuit 140 is operable to detect a video signal input from a newly coupled source device), or another wireless video source device establishes a wireless projection connection with the display control apparatus 100 (i.e., the network interface circuit 120 is operable to detect a request for wireless projection connection that is sent by a source device), the display control apparatus 100 automatically enters the screen-splitting mode or the PiP mode, so that the display module 15 is able to simultaneously display video contents provided by two wireless/wired video source devices.

Figure 6A:
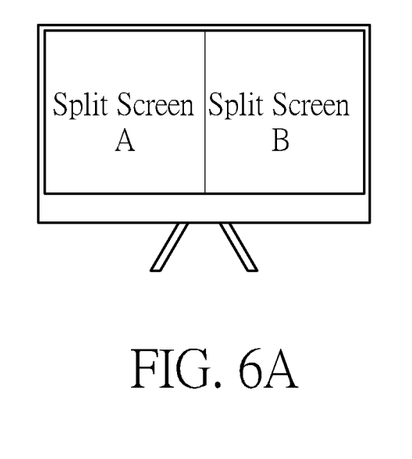
FIG. 6A and FIG. 6B respectively illustrate examples of a screen-splitting mode and a PiP mode in embodiments of the present invention.
Figure 6B:
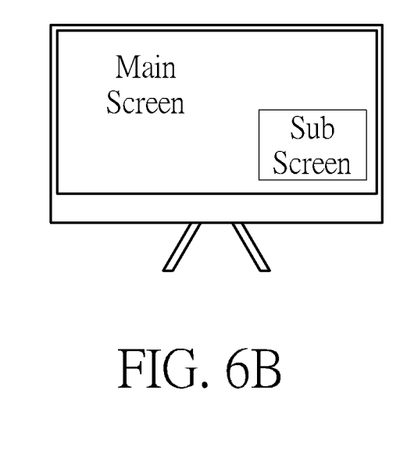

It should be noted that, although in the above-mentioned embodiments, the display device 10 is always operable to present video contents from different video source devices in the screen-splitting mode, as shown in FIG. 6B, the display control apparatus 100, however, is able to present video contents from different source devices in the PiP mode. In addition, the present invention does not limit the sizes and the number of the split screens or the sizes and the number of the main screen/the sub screen. In various embodiments, the screen-splitting mode or the PiP mode that can be implemented by the display control apparatus 100 may have more or fewer sub screens than the embodiments shown in FIG. 6A and FIG. 6B, or have different aspect ratios and sizes compared to the embodiments shown in FIG. 6A and FIG. 6B.

Figure 7:
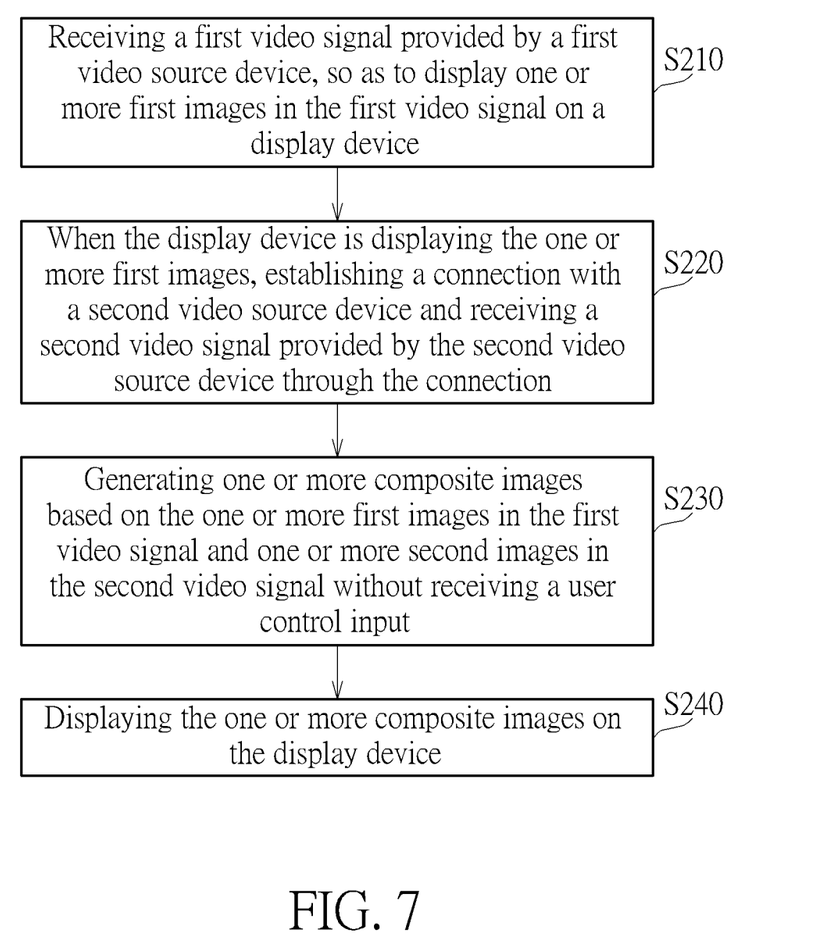
FIG. 7 is a flowchart illustrating a display control method according to one embodiment of the present invention.

FIG. 7 illustrates a flowchart of a display control method according to one embodiment of the present invention. The display control method of the present invention has the following steps:

S210: receiving a first video signal provided by a first video source device to display one or more first images in the first video signal on a display device;

S220: when the display device is displaying the one or more first images, establishing a connection with a second video source device and receiving a second video signal provided by the second video source device through the connection;

S230: generating one or more composite images based on the one or more first images in the first video signal and the one or more second images in the second video signal without receiving a user control input; and S240: displaying the one or more composite images on the display device.

Since detailed principles, specific operations and related modifications of implementations regarding the above steps have been explained expressly in the foregoing descriptions of the display control apparatus, they will not be described repeatedly for the sake of brevity. One of ordinary skill in the art should be able to implement the display control method of the present invention based on the above steps after fully understanding the foregoing descriptions. It should be noted that it is possible to better implement the PiP mode or the screen-splitting mode on the display device by adding other additional steps or making appropriate changes or adjustments to/on the above flow, thereby further improving the user experience. Such modifications to the implementation should also fall within to the scope of the present invention.

To sum up, the present invention is able to detect the new wireless projection connection/the new wired connection and accordingly trigger the screen-splitting mode or the PiP mode of the display device, thereby reducing the degree of user intervention and providing a better user experience. Moreover, the present invention also solves the problem that the conventional display devices do not support displaying video contents from the wireless projection in the PiP mode.

Embodiments in accordance with the present embodiments can be implemented as an apparatus, method, or computer program product. Accordingly, the present embodiments may take the form of an entirely hardware embodiment, an entirely software embodiment, or an embodiment combining software and hardware aspects that can all generally be referred to herein as a "module" or "system." Furthermore, the present embodiments may take the form of a computer program product embodied in any tangible medium of expression having computer-usable program code embodied in the medium. In terms of hardware, the present invention can be accomplished by applying any of the following technologies or related combinations: an individual operation logic with logic gates capable of performing logic functions according to data signals, and an application specific integrated circuit (ASIC), a programmable gate array (PGA) or a field programmable gate array (FPGA) with a suitable combinational logic.

The flowchart and block diagrams in the flow diagrams illustrate the architecture, functionality, and operation of possible implementations of systems, methods, and computer program products according to various embodiments of the present embodiments. In this regard, each block in the flowchart or block diagrams may represent a module, segment, or portion of code, which comprises one or more executable instructions for implementing the specified logical function(s). It is also noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions. These computer program instructions can be stored in a computer-readable medium that directs a computer or other programmable data processing apparatus to function in a particular manner, such that the instructions stored in the computer-readable medium produce an article of manufacture including instruction means which implement the function/act specified in the flowchart and/or block diagram block or blocks.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A display control method, comprising:
   receiving a first video signal provided by a first video source device to display one or more first images in the first video signal on a display device;
   when the display device is displaying the one or more first images, establishing a wireless projection connection with a second video source device and receiving a second video signal provided by the second video source device through the wireless projection connection;
   generating one or more composite images based on the one or more first images in the first video signal and one or more second images in the second video signal upon detecting the wireless projection connection without receiving a user control input; and
   displaying the one or more composite images on the display device.

2. The display control method of claim 1, wherein the step of receiving the first video signal provided by the first video source device comprises:
   receiving the first video signal provided by the first video source through a wired connection.

3. The display control method of claim 2, wherein the wired connection is a High Definition Multimedia Interface (HDMI) connection or a DisplayPort (DP) connection.

4. The display control method of claim 1, wherein the step of receiving the first video signal provided by the first video source device comprises:
   receiving the first video signal provided by the first video source through a wireless connection.

5. The display control method of claim 1, wherein the wireless projection connection is based on Airplay protocol or Miracast protocol.

6. The display control method of claim 1, wherein the step of establishing the connection with the second video source device comprises:
   utilizing a near-field communication connection to establish the wireless projection connection with the second video source device.

7. The display control method of claim 1, wherein each of the one or more composite images includes at least a first region and a second region; the first region includes one of the one or more first images, and the second region includes one of the one or more second images.

8. A display control apparatus for use in a display device, comprising:
   a processing circuit, configured to receive a first video signal provided by a first video source device, allowing the display device to display one or more first images in the first video signal;
   wherein the display control apparatus is operable to establish a wireless projection connection with a second video source device and receive a second video signal provided by the second video source device through the wireless projection connection when the display device is displaying the one or more first images; and the processing circuit is configured to generate one or more composite images based on the one or more first images in the first video signal and one or more second images in the second video signal upon detection the wireless projection connection without receiving a user control input, thereby to allow the display device to display the one or more composite images.

9. The display control apparatus of claim 8, further comprising:
a video transmission interface circuit, configured to receive the first video signal provided by the first video source device through a wired connection.

10. The display control apparatus of claim 9, wherein the wired connection is a High Definition Multimedia Interface (HDMI) connection or a DisplayPort (DP) connection.

11. The display control apparatus of claim 8, further comprising:
a network interface circuit, configured to receive the first video signal provided by the first video source through a wireless connection and configured to receive the second video signal provided by the second video source through the wireless projection connection.

12. The display control apparatus of claim 8, wherein the wireless projection connection is based on Airplay protocol or Miracast protocol.

13. The display control apparatus of claim 8, further comprising:
a near-field communication interface circuit, configured to establish the wireless projection connection with the second video source device through a near-field communication connection.

14. The display control apparatus of claim 8, wherein each of the one or more composite images includes at least a first region and a second region; the first region includes one of the one or more first images, and the second region includes one of the one or more second images.

15. A display device, comprising:
a display module; and
a display control apparatus, coupled to the display module, configured to control displaying of the display module, comprising:
a processing circuit, configured to receive a first video signal provided by a first video source device, allowing the display module to display one or more first images in the first video signal;
wherein the display control apparatus is operable to establish a wireless projection connection with a second video source device and receive a second video signal provided by the second video source device through the wireless projection connection when the display module is displaying the one or more first images; and the processing circuit is configured to generate one or more composite images based on the one or more first images in the first video signal and one or more second images in the second video signal upon detecting the wireless projection connection without receiving a user control input, thereby to allow the display module to display the one or more composite images.

* * * * *